Feb. 4, 1947.  J. G. KREYER  2,415,290
TRACTOR TIRE
Original Filed March 12, 1945   4 Sheets-Sheet 2

INVENTOR
JOHN G. KREYER, DECEASED
BY HELEN E. KREYER, EXECUTRIX

BY Ely & Frye

ATTORNEYS

Feb. 4, 1947.  J. G. KREYER  2,415,290
TRACTOR TIRE
Original Filed March 12, 1945   4 Sheets-Sheet 3
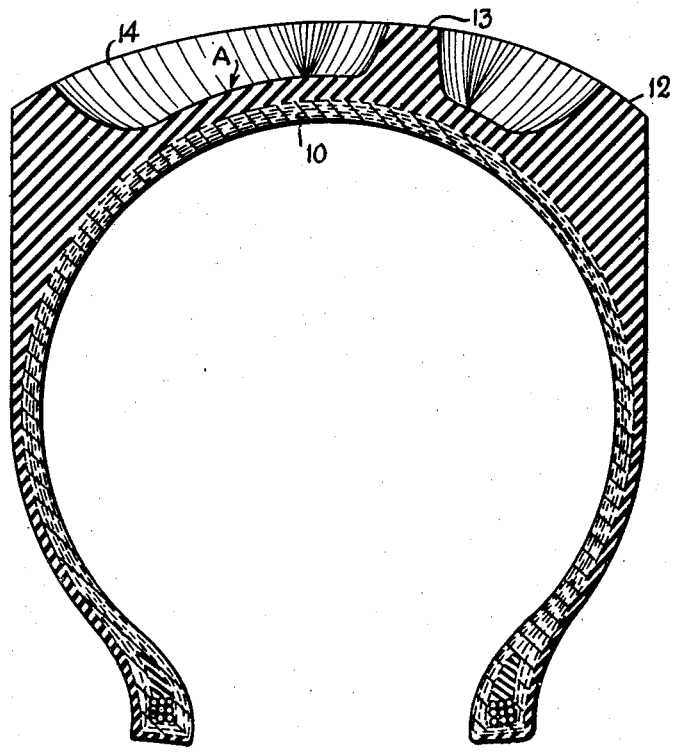
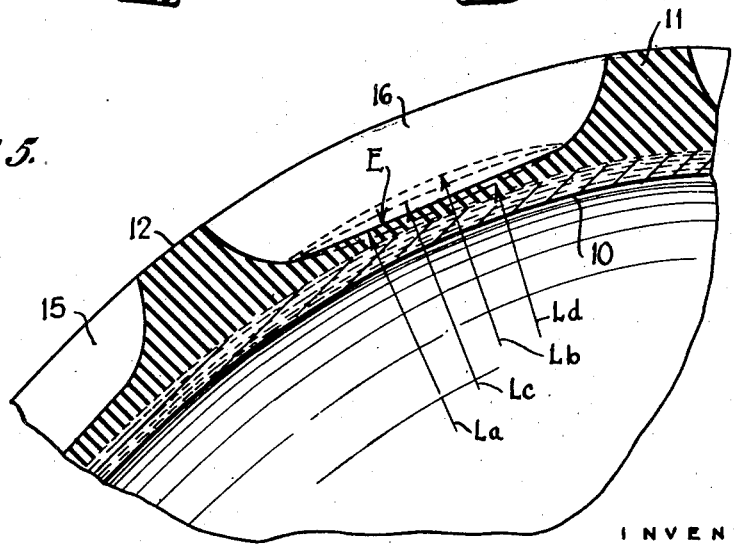
INVENTOR
JOHN G. KREYER, DECEASED
BY HELEN E. KREYER, EXECUTRIX
BY Ely & Frye
ATTORNEYS

INVENTOR
JOHN G. KREYER, DECEASED
BY HELEN E. KREYER, EXECUTRIX

BY Ely & Frye

ATTORNEYS

Patented Feb. 4, 1947

2,415,290

UNITED STATES PATENT OFFICE 2,415,290

TRACTOR TIRE

John G. Kreyer, deceased, late of Akron, Ohio, by Helen E. Kreyer, executrix, Akron, Ohio, assignor to The Firestone Tire & Rubber Company, Akron, Ohio, a corporation of Ohio Original application March 12, 1945, Serial No. 582,366. Divided and this application October 8, 1946, Serial No. 702,037. In Canada March 5, 1946

11 Claims. (Cl. 152—209)

This invention relates to pneumatic tires and it refers more particularly to tractor tires whose treads have large, deep, widely spaced traction elements, such, for example, as disclosed in U. S. patents to Clair G. Hoover 2,011,552, James E. Hale 2,113,527, and William S. Coben 2,324,996. Tire tread constructions of this type are used in providing maximum traction in soft soil operations. In such tread constructions or designs the traction elements are in the form of bars with the minimum bar spacing being substantially greater than the maximum bar width. Heretofore, tractor tires of the type described were designed so that the surface area of the treads between the traction elements was convex in form. Before the present invention, a tire cavity in a tire mold was formed in two boring mill operations, one for sweeping out the base contour of the mold, which is also referred to as the "top line," by those familiar with the art. After the plain cavities were swept out, the necessary recesses, grooves, fillets, etc., for the traction elements were then engraved or cut intaglio in the second operation.

Tires of the class described, vulcanized in molds used heretofore have not been entirely satisfactory and have presented serious problems to the tire industry. Tire engineers and tire production men have sought diligently for a solution to certain faults of said tires, which faults shall be pointed out and discussed hereinafter. However, until the present invention, a solution to the problems had not been found.

Heretofore, that part of the tire ply fabric under the large, deep traction elements of tires of the said Coben type were lifted or drawn toward the traction elements during the tire molding operation. Also the amount of tread rubber adjacent to the base of said elements was undesirably thin and the thickness of the tread rubber in the central area between said elements was of greater thickness than required or desired. In cord tires, cord of uneven stretch causes unequal strains on the fabric cords. Thick rubber between said elements is a waste of rubber and causes the cords of the tire plies to take improper cord direction by pressing the cord ply stock radially inwardly of the tire.

It was discovered that the concave portion of the tire mold surface which formed or molded the convex surface of a tire between the large traction elements actually trapped the rubber therein and did not permit the necessary flow of rubber from the area between, and removed somewhat from the traction elements to fill that part of the mold cavity in which said traction elements were formed; that this resulted in the mold, at the edges of the traction elements, sinking deeply into the rubber of the tire tread leaving an inadequate amount of rubber adjacent to the traction elements, while at the same time the ply fabric of the tire was lifted, or drawn, by the force of the tire curing bag into the traction element portion of the mold cavity. This problem was solved by constructing a tire in which the convexity of the formerly convex surfaces between said traction elements was reduced and in some instances changed to circumferentially substantially flat or concave surfaces, with corresponding flat or convex surfaces in the mold. This was accomplished, as will be understood by those familiar with the art, by radically altering the method of making the tire mold. To make a mold in which a tire embodying the present invention is to be molded, it is necessary to stop the usual boring mill operation at a point where there is still enough metal to scrape or otherwise form circumferentially flat or convex areas between the traction element recesses of the mold. The conception of the invention involved a further valuable contribution to the art, in that by eliminating the convexity of the surface area, as just described, a greater depth of cavity between the traction elements results with no increase in the height of the traction elements. The load carrying characteristics of any given traction element are not affected, but the bottom of the grooves defined by said traction elements of the new tire are removed farther from contact with the road surface, thereby providing longer effective life of the tire.

An object of the present invention is to produce a tire of the class described in which the portion of the tread rubber which lies centrally between the traction elements is no greater in thickness than adjacent the edges of said elements.

Another object of the invention is to increase the distance between the central portion of the bottom of the groove between tire traction elements and the top line of said traction elements, thereby providing longer effective life to the traction elements for a given quantity of rubber used. Other objects and advantages of the invention will be apparent to those familiar with the art from the following description in connection with the accompanying drawings wherein:

Fig. 4 is a transverse section along line 4—4 of Fig. 2;

Fig. 5 is a longitudinal section taken along line 5—5 of Fig. 2 and indicating by dotted lines various circumferential contours of the bottom surface of tire tread grooves;

Fig. 6 is a partial circumferential sectional view taken on line 6—6 of Fig. 2 and illustrating the contour of the surface of the tire between the traction elements of the tread of a tire embodying the present invention, the dotted line indicating the contour of such tires before the present invention;

Fig. 7 is the same as Fig. 6 except the contour of the surface of the tire, between the traction elements, is shown as concave rather than flat as shown in Fig. 6;

Fig. 10 is similar to Fig. 5 and illustrates the misplacement of tread rubber and tire fabric as it occurred in the prior art.

The present application is a division of copending application Serial No. 582,366, filed March 12, 1945, by John G. Kreyer.

Figure 1:
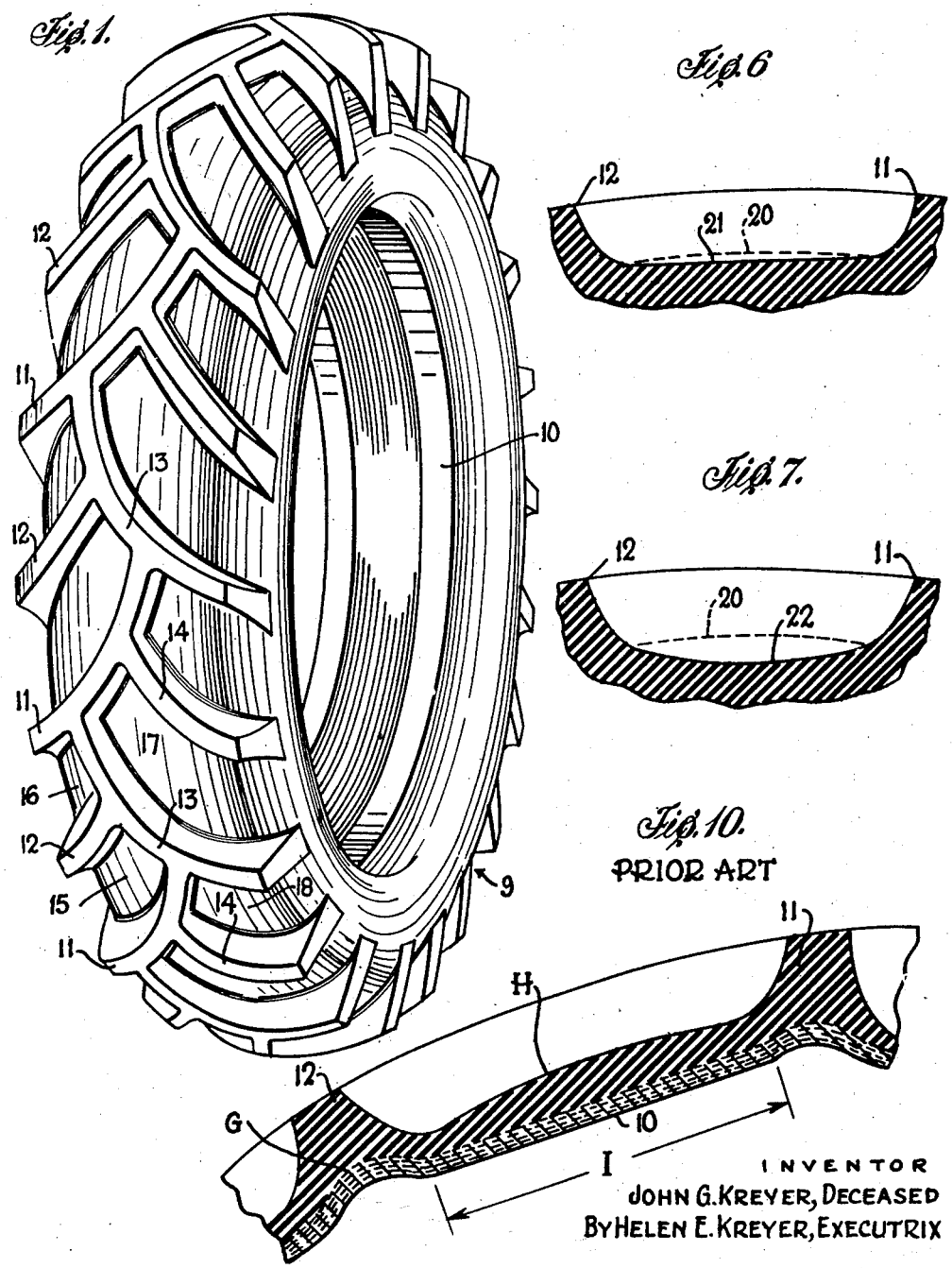
Fig. 1 is a perspective view of a tire embodying the invention.
Figure 2:
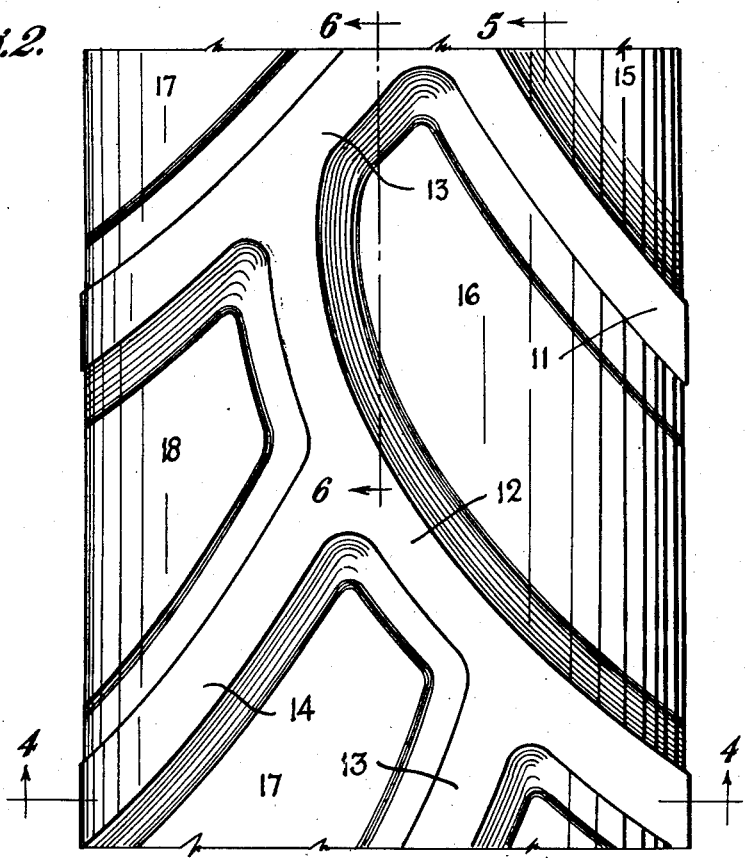
Fig. 2 is a plan view of a portion of the tire shown in Fig. 1.
Figure 3:
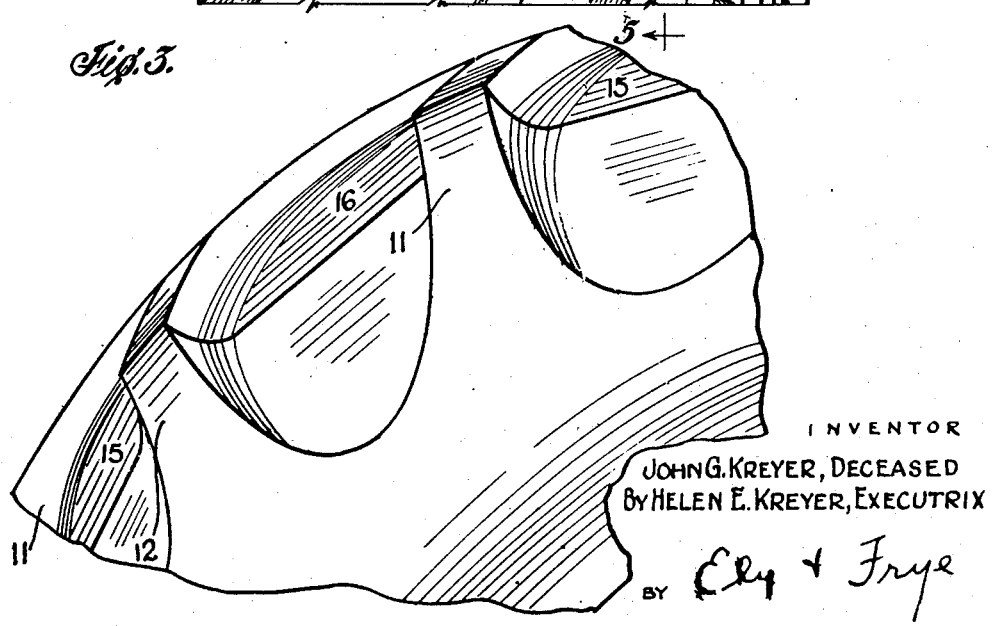
Fig. 3 is a side elevation of a portion of the tire shown in Fig. 1.

Referring now more particularly to the drawings, in Fig. 1 a tire 9, having the usual carcass 10, is shown having large, widely spaced traction elements 11, 12, 13 and 14 defining grooves or cavities 15, 16, 17 and 18 therebetween. By reference to Figs. 4 and 5 it will be seen that the surface of the bottoms of the grooves 15 and 16 are arcuate in contour laterally of the tire as best seen in Fig. 4 but, as shown in Fig. 5, that the contour of the cavities 15 and 16 are flat or straight in circumferential section. It will also be seen by reference to Figs. 4 and 5 that the thickness of rubber at the central area E of the cavities 15 and 16 is no greater than the thickness of rubber adjacent to the base of the traction elements 11, 12 and 13.

Referring next to Fig. 6 an arcuate dotted line 20 is shown above a straight line 21. These lines 20 and 21 illustrate the relative circumferential contour of the bottoms of the recesses between the traction elements before and after the present invention, the dotted line 20 representing before, and the line 21 representing after the present invention.

Applicant further found that improvement over the prior art would be obtained if the convex surfaces of the bottoms of the said tread grooves were changed to circumferentially concave surfaces as indicated by the solid surface line 22 of Fig. 7. The dotted line 20 of Fig. 7 represents the usual circumferential convexity of the bottom of said grooves before applicant's invention. It will be understood that the benefits of applicant's invention will be progressively approached as the said circumferential convexity of the bottoms of said grooves approaches a straight or concave line; however, it has been found that in order to correct the faults of tires pointed out hereinabove, the bottoms of said grooves should be at least substantially flat or concave circumferentially of the tire.

Fig. 5 further illustrates the invention by illustrating in one view several of the numerous circumferential contours which the surface of the bottom of grooves may have. Contour identified by line L$a$ corresponds to line 21 of Fig. 6, similarly line L$b$ corresponds to the prior art lines 20 of Figs. 6 and 7, and line L$d$ corresponds to line 22 of Fig. 7. Line L$c$ indicates a circumferential groove bottom surface contour only slightly flattened over the prior art. It will now be clear to those familiar with tire design that the central portion of said tread grooves identified by lines L$c$, L$a$ and L$d$ are in the order just mentioned, closer to the axis of the tire than the central portion of the contour of the prior art identified by line L$b$. The extent to which the bottoms of the tread grooves will have to be modified over the prior art in the manner indicated above will depend generally on the volume of rubber which must be molded into the tread bars and the distance the rubber moves in molding.

Figure 8:
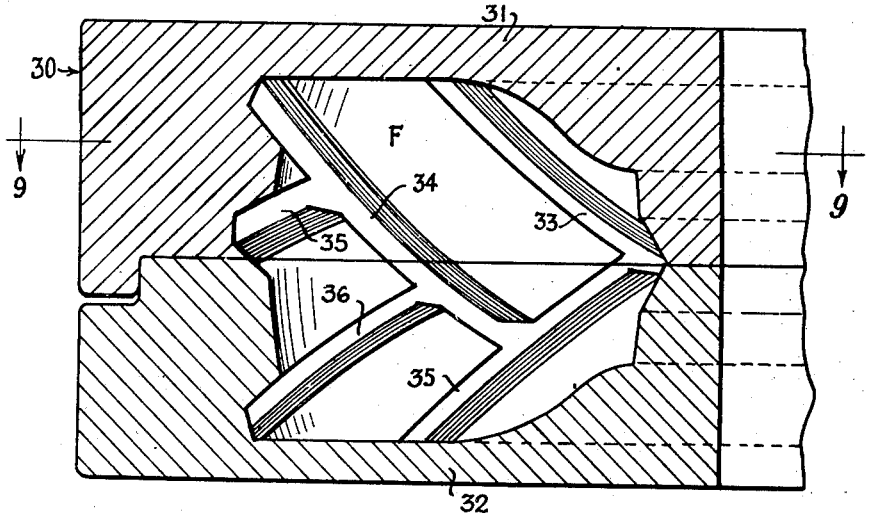
Fig. 8 is a fragmentary sectional view of a tire mold in which the tire shown in Fig. 1 was molded.
Figure 9:
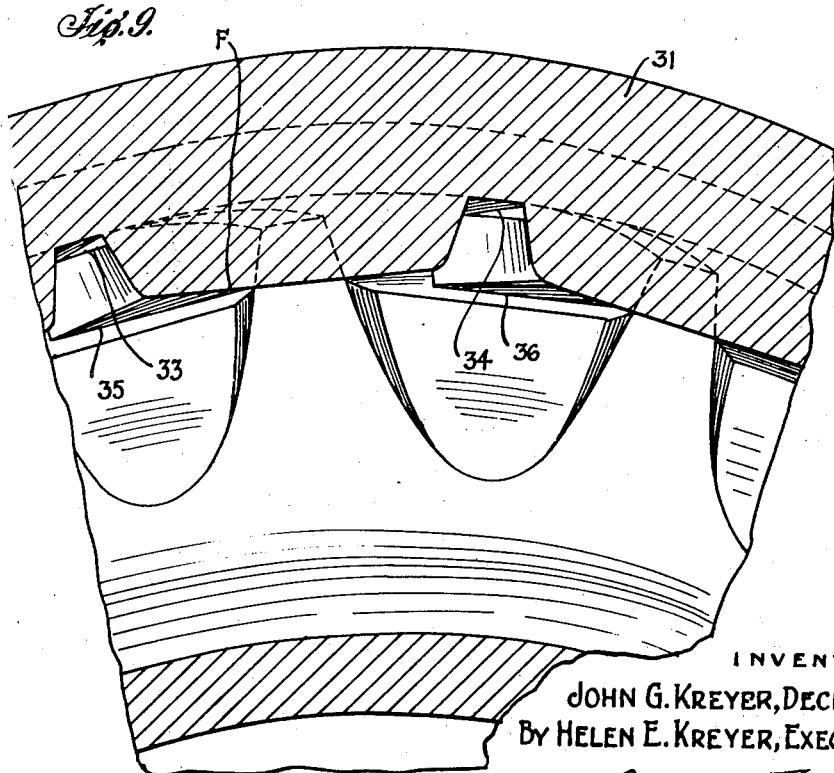
Fig. 9 is a section taken on line 9—9 of Fig. 8.

In Fig. 8 there is shown a fragmentary sectional view of a tire mold 30 of the pot heater type adapted to mold the tire shown in Fig. 1. Said mold comprises the usual top and bottom halves 31 and 32 respectively. It will be seen, however, by reference to Fig. 9 that instead of the circumferential contour being the true circle, heretofore used in tire molds, the present mold has a circumferential contour between the traction element cavities of the mold which consists of many sides, which results from forming circumferentially flat areas F in the mold between the mold's traction element cavities 33, 34, 35 and 36. The cavities 33, 34, 35 and 36 of the mold shown in Fig. 8 form the traction elements 11, 12, 13 and 14 respectively of the tire shown in Fig. 1. If the bottoms of said recesses 15, 16, 17 and 18 of the tire 9 are to have concave circumferential lines such as, for example, as is shown in Fig. 7, then the surfaces of the mold will be correspondingly convex, as will be understood by those familiar with the art. The method of manufacturing tire molds of the form described above has been briefly discussed in the first paragraph above and the details of the method necessary to manufacture such molds will be obvious to those familiar with machine shop practices.

It will now be seen that applicant has produced a tire mold of a construction that makes possible for the first time in the art the proper molding of a tire of the type described; that he has increased the depth of the cavities between the traction elements of the tread without adversely affecting the stability of said traction elements; that the present invention for the first time makes possible the molding of a tire of the type described without the tire ply fabric lifting into tread traction element cavities of the mold, and also the molding of such tire without an undesirable amount of rubber being trapped in the central areas of the bottoms of the tread cavities defined by the traction elements of the tire tread.

By reference to Figs. 5 and 10 it will be seen by comparison that the improvement in tire construction effected by applicant's invention is a substantial contribution to the art. In Fig. 10, which shows the relative position of the tread rubber and the fabric plies of tires of the type described before the present invention, it will be seen that the ply fabric 10 at G is lifted or drawn into the base portions of the traction elements 12 and 11. It will also be seen that there is a greater thickness of tread rubber over the fabric plies at H in Fig. 10 than at E of Fig. 5, and that the accumulation of tread rubber at H together with the flow or lift of ply stock into the traction elements results in a flattened area I on the inside of the tire.

Modifications may be resorted to without departing from the spirit of the invention which is to be limited; therefore, only by the prior art and the scope of the appended claims.

What is claimed is:

1. A pneumatic tire for use on motor vehicles adapted to operate on and off the road, said tire comprising a flexible casing having a tread portion formed integrally with transverse traction elements arranged in circumferentially spaced series thereon, said traction elements comprising upstanding lugs, which lugs define recesses therebetween of greater transverse width than the width of the lugs, the bottoms of said recesses being straight circumferentially of the tire, as viewed in side elevation.

2. A pneumatic tire of the character described, said tire comprising a flexible casing having a tread portion formed integrally with transverse traction elements arranged in circumferential series thereon, said traction elements comprising spaced upstanding lugs, which lugs define recesses therebetween wider transversely than the width of said lugs, the bottoms of said recesses being concave in longitudinal section of the tire, said concavity being defined in longitudinal section by a circumferential section of a circle, the center of which is disposed exteriorly of said tire.

3. A pneumatice tire of the type having tread bars spaced at a greater distance than the bar width, comprising a casing having a tread portion, said tread portion having two series of traction elements in the form of outwardly projecting, laterally extending, elongated lugs arranged successively in circumferentially spaced relation with the lugs of the same series and defining grooves between said lugs, the width of said grooves at their narrowest point being greater than the width of said lugs at their widest portion and the thickness of the tread rubber at the central area of the bottom of a groove being no greater than the thickness of the tread rubber at the base of the lugs defining said groove.

4. A pneumatic tire of the character described, comprising a casing having a tread portion including laterally extending elongated lugs arranged successively in circumferentially spaced relation with the lugs of the same series and defining grooves between said lugs, said grooves being of greater minimum transverse dimension than the maximum width of said lugs the thickness of tread rubber at the central area of the bottom of a groove being no greater than the thickness of the tread rubber at the base of the lugs defining said groove.

5. A pneumatic tire of the character described, comprising a casing having a tread portion, said tread portion having two series of traction elements in the form of outwardly projecting, laterally extending, elongated lugs, arranged successively in circumferentially spaced relation with the lugs of the same series and defining grooves between said lugs, the width of said grooves at their narrowest point being greater than the width of said lugs at the widest point thereof and the bottom of said grooves being straight circumferentially of the tire, as viewed in side elevation.

6. A pneumatic tire of the traction type described, comprising a casing having a tread portion, said tread portion having two series of traction elements in the form of radially outwardly projecting, laterally extending, elongated lugs, arranged successively in circumferentially spaced relation with the lugs of the same series and defining grooves between said lugs, the width of said grooves at their narrowest point being greater than the width of said lugs, at the widest point thereof, the bottom of said grooves being substantially concave circumferentially of the tire.

7. A pneumatic tire of the character described, said tire comprising a flexible casing having a tread portion formed integrally with transverse traction elements arranged circumferentially thereon, said traction elements defining recesses therebetween of greater transverse dimensions than the base of the elements, the radius of the tire at the surface of the bottom of the central portion of each recess being a distance less than the length of the radius of the tire at the base of said lugs, measured in a plane at right angles to the axis of the tire.

8. A pneumatic traction tire of the character described, comprising a casing and a tread portion integral therewith, said tread portion comprising a plurality of elongated lugs disposed laterally of the tire and in circumferentially spaced relation, at distances greater than the width of said lugs to provide intervening grooves, said grooves having bottom wall portions which are convex laterally of the tire but straight in longitudinal sections thereof.

9. A tire of the class described having spaced traction lugs defining tread grooves therebetween; the minimum width of said grooves being greater than the maximum width of said lugs, the surface at any point in the central portion of said grooves being spaced a distance from the axis of the tire less than the distance from said axis to the base of said lugs, measured in a plane at right angles to the axis of the tire.

10. A pneumatic tire comprising a flexible casing having a tread portion formed integrally therewith and including circumferentially spaced transversely extending tread bars defining recesses therebetween, said recesses being wider transversely thereof, at their narrowest width, than the greatest transverse bar width, the surfaces of said recesses being continuously concave between the tread bars in a direction circumferentially of the tire.

11. A tire including a tread portion comprising a plurality of elongated lug bars disposed to extend laterally of the tire and in circumferentially spaced relation to define grooves the minimum transverse dimensions of which are greater than the maximum bar width, with bottom surfaces of said grooves presenting a straight sided polygonal configuration in any longitudinal section of the tire, with the lug bars integrally joined at the apices of the polygon.

HELEN E. KREYER,
*Executrix of the Estate of John G. Kreyer, Deceased.*

REFERENCES CITED

The following references are of record in the file of this patent:

UNITED STATES PATENTS

| Number | Name | Date |
|---|---|---|
| D. 88,780 | Gunsaulus | Dec. 27, 1932 |
| D. 100,172 | MacKusick | June 23, 1936 |
| 2,065,697 | Hawkinson | Dec. 29, 1936 |
| 2,113,527 | Hale | Apr. 5, 1937 |
| 2,324,996 | Coben | July 20, 1943 |

FOREIGN PATENTS

| Number | Country | Date |
|---|---|---|
| 208,467 | Switzerland | 1940 |